(12) United States Patent
Turner (10) Patent No.: US 12,434,973 B2
(45) Date of Patent: Oct. 7, 2025

(54) GRAPHITE MATERIAL PURIFICATION PROCESS

(71) Applicant: Talga Technologies Limited, Histon (GB)

(72) Inventor: Duncan Turner, Buderim (AU)

(73) Assignee: TALGA TECHNOLOGIES LIMITED, Cambridge (GB)

( * ) Notice: Subject to any disclaimer, the term of this patent is extended or adjusted under 35 U.S.C. 154(b) by 0 days.

(21) Appl. No.: 18/988,116

(22) Filed: Dec. 19, 2024

(65) Prior Publication Data

US 2025/0128952 A1  Apr. 24, 2025

Related U.S. Application Data

(63) Continuation of application No. PCT/IB2023/056656, filed on Jun. 28, 2023.

(30) Foreign Application Priority Data

Jun. 29, 2022 (AU) ................. 2022901820

(51) Int. Cl.
  *C01B 32/215* (2017.01)
  *B01D 11/02* (2006.01)

(52) U.S. Cl.
  CPC ........ *C01B 32/215* (2017.08); *B01D 11/0288* (2013.01); *C01P 2006/12* (2013.01); *C01P 2006/40* (2013.01); *C01P 2006/80* (2013.01)

(58) Field of Classification Search
  CPC .............. C01B 32/215; B01D 11/0288; C01P 2006/12; C01P 2006/40; C01P 2006/80
  See application file for complete search history.

(56) References Cited

U.S. PATENT DOCUMENTS

2018/0053929 A1* 2/2018 Yamashita .......... H01M 4/5825
2020/0290880 A1* 9/2020 Rohde ....................... B03C 1/01

FOREIGN PATENT DOCUMENTS

| CN | 109775698 A | * | 5/2019 |
| FR | 2327196 A1 | | 5/1977 |
| WO | 2021232090 A1 | | 11/2021 |

OTHER PUBLICATIONS

English machine translation of FR2327196 (1975).*

(Continued)

*Primary Examiner* — Richard M Rump
(74) *Attorney, Agent, or Firm* — Leber IP Law; Celia H. Leber (57) ABSTRACT

A graphite material purification process comprising a pelletisation step, a caustic baking step providing a sintered product, a water leach step whereby impurity minerals are solubilised, forwarded for effluent treatment, and separated, a first sulphuric acid leach step wherein remaining impurity minerals are solubilised, forwarded for effluent treatment, and separated from leach solids, a hydrofluoric acid leach step wherein partially leached impurity minerals are solubilised, forwarded for effluent treatment, and separated from leach solids, a second sulphuric acid leach step wherein impurity minerals not leached in previous steps and components precipitated in the hydrofluoric acid leach step are solubilised, forwarded for effluent treatment, and separated from leach solids, and washing stages wherein remaining soluble impurities are separated, and providing a purified graphite material.

29 Claims, 2 Drawing Sheets

(56) References Cited

OTHER PUBLICATIONS

Cruz, Sandra M., et al. "Microwave-induced combustion method for the determination of trace and ultratrace element impurities in graphite samples by ICP-OES and ICP-MS." Microchemical Journal 123 (2015): 28-32.*
International Patent Application No. PCT/IB2023/056656, Written Opinion dated Mar. 28, 2024, 7 pages.
International Patent Application No. PCT/IB2023/056656, International Preliminary Report on Patentability dated Sep. 18, 2024, 25 pages.
International Patent Application No. PCT/IB2023/056656, Search Report and Written Opinion dated Dec. 15, 2023, 20 pages.
Jara; et al., "Chemical purification processes of the natural crystalline flake graphite for Li-ion Battery anodes", Materials Today Communications, vol. 25, Dec. 1, 2020 (Dec. 1, 2020), p. 101437, XP093086356, GB, ISSN: 2352-4928, DOI: 10.1016/j.mtcomm.2020.101437196.
Chelgani; et al.; "A Review of Graphite Beneficiation Techniques", Mineral Processing and Extractive Metallurgy Review, vol. 37, No. 1, Nov. 20, 2015 (Nov. 20, 2015), pp. 58-68, XP055419075, US, ISSN: 0882-7508, DOI: 10.1080/08827508.2015.1115992.
Lammerer; et al., "Things to Know about Characterization and Beneficiation of Natural Graphites", BHM. Berg-und Huettenmaennische Monatshefte, Springer, Vienna, AU, vol. 162, No. 8, Jul. 25, 2017 (Jul. 25, 2017), pp. 336-344, XP036294059, ISSN: 0005-8912, DOI: 10.1007/S00501-017-0651-2 [retrieved on Jul. 25, 2017].

* cited by examiner

FIGURE 1

Table 10

| Sample | Scale | Test No. | Graphite Feed Material | | | | Additives** | | Final Pellet Mixture | |
|---|---|---|---|---|---|---|---|---|---|---|
| | Eirich Equipment | | Cg | Si | Starting Moisture | Recalc* Moisture | NaOH Add'n | Fines Add'n | Final Moisture | Comments |
| | Model | | (%w/w) | (%w/w) | (%w/w) | (%w/w) | (kg/t dry) | (kg/t dry) | (%w/w) | |
| M9584B | | | 75.40 | 6.14 | | | | | | |
| | R01-5L | 16A | | | 0.0 | 18.0 | 454 | 0 | 13.1 | Sticky & hard clusters, poor flowability |
| | R01-5L | 16B | | | 0.0 | 18.0 | 454 | 20 | 13.0 | Not sticky, 2-20mm pellets, reasonable flowability |
| | R01-5L | 16C | | | 0.0 | 18.0 | 454 | 50 | 12.8 | Not sticky, 2-20mm pellets, good flowability |
| | R01-5L | 17 | | | 17.7 | 22.4 | 454 | 50 | 16.1 | 2-10mm pellets, good flow properties |
| | R01-5L | 18A | | | 17.7 | 25.9 | 454 | 50 | 18.8 | Sticky pellets |
| | R01-5L | 18B | | | 17.7 | 25.9 | 454 | 75 | 18.6 | Good pellets |
| | R01-5L | 20 | | | 0.0 | 30.2 | 454 | 200 | 20.8 | Large agglomerates |
| | R01-5L | 19 | | | 0.0 | 40.0 | 454 | 100 | 30.0 | Paste |
| M9584C | | | 83.90 | 2.46 | | | | | | |
| | R01-5L | 1 | | | 22.2 | 22.2 | 183 | 50 | 18.8 | 2-8mm pellets, good flowability |
| | R08W-75L | B1 | | | 0.0 | 28.1 | 183 | 50 | 24.0 | 2-8mm pellets, good flowability |
| | R08W-75L | B3 | | | 0.0 | 28.1 | 183 | 50 | 24.0 | 2-8mm pellets, good flowability |

Key: * Total water in concentrate and added to test expressed as concentrate moisture equivalent
** Expressed as kg/t dry graphite material

FIGURE 2

GRAPHITE MATERIAL PURIFICATION PROCESS

RELATED APPLICATIONS

This application is a continuation of International Patent Application No. PCT/IB2023/056656, filed Jun. 28, 2023, which claims priority from Australian Patent Application No. 2022901820, filed Jun. 29, 2022, the entire disclosures of which are incorporated herein by reference.

FIELD OF THE INVENTION

The present invention relates to a graphite material purification process.

More particularly, the graphite material purification process of the present invention is intended to be applicable to the purification of low graphite content materials.

In particular, the graphite material purification process of the present invention is intended for the production of graphite material that is of a purity suitable for use in the production of lithium-ion batteries (LiBs).

BACKGROUND ART

Graphite that is to be utilised in the production of lithium-ion batteries (LiBs) is typically required to be highly pure, for example greater than 99.90% Loss on Ignition (LOI). It should be noted however that LiB purity requirements do also depend on the LiBs blending and formulation specifics. The purity requirement presents challenges to producing suitable graphite product from material with relatively low graphite content, for example 60 to 70% Cg, and in which there are relatively high levels of silicate, sulphide, titanium and base metal minerals. These challenges are heightened if the contaminant minerals are highly disseminated throughout the graphite ore and it is desired to reduce or minimise carbon losses.

Presently employed methods for the purification of graphite for use in the production of LiBs employ particularly aggressive acid leaching steps, typically employing a leach step requiring high concentrations and volumes of hydrofluoric acid. This results in significant environmental and occupational health and safety concerns. These methods also have low levels of carbon recovery, for example below about 85%. Further, these methods generally also start with graphite materials with greater or equal to 90% carbon content.

There would be significant advantage and benefit to providing an improved graphite material purification process that reduced carbon losses and/or reduced reliance on large volumes of highly concentrated acids.

The graphite material purification process and product of the present invention have as one object thereof to overcome substantially one or more of the abovementioned problems associated with prior art processes, or to at least provide a useful alternative thereto.

The preceding discussion of the background art is intended to facilitate an understanding of the present invention only. This discussion is not an acknowledgement or admission that any of the material referred to is or was part of the common general knowledge as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

It is to be understood that the ranges provided herein include the stated range and any value or sub-range within the stated range. For example, a range from about 1 micrometer (μm) to about 2 μm should be interpreted to include not only the explicitly recited limits of from between from about 1 μm to about 2 μm, but also to include individual values, such as about 1.2 μm, about 1.5 μm, about 1.8 μm, etc., and sub-ranges, such as from about 1.1 μm to about 1.9 μm, from about 1.25 μm to about 1.75 μm, etc. Furthermore, when "about" and/or "substantially" are/is utilised to describe a value, they are meant to encompass minor variations (up to +/−10%) from the stated value. Still further, when reference is made to a "trace amount" of something it is a reference to a concentration of less than about 100 micrograms per gram.

It is to be further understood that references to the % recovery or % removal of an element or mineral, or similar, are, unless the context demands otherwise, a reference to the % of that component recovered or removed relative to the original content of the feed to the described process. Other references to % are, again as long as the context does not require otherwise, to be taken as references to weight or wt % (rather than volume or v %).

DISCLOSURE OF THE INVENTION

In accordance with the present invention there is provided a graphite material purification process, the process comprising the steps of:

(i) Passing a concentrate of the graphite material to be purified to a pelletisation step providing a pelletised material;

(ii) Baking the pelletised material of step (i) in caustic conditions providing a sintered product and whereby one or more impurity minerals are rendered soluble;

(iii) Passing the sintered product of step (ii) to a water leach step whereby at least a portion of the impurity minerals from step (ii) are solubilised, forwarded for effluent treatment, and separated from leach solids;

(iv) Passing the leach solids of step (iii) to a first sulphuric acid leach step wherein impurity minerals partially leached in step (iii) are solubilised, forwarded for effluent treatment, and separated from leach solids;

(v) Passing the leach solids of step (iv) to a hydrofluoric acid leach step wherein partially leached impurity minerals are solubilised, forwarded for effluent treatment, and separated from leach solids;

(vi) Passing the leach solids of step (v) to a second sulphuric acid leach step wherein impurity minerals or components precipitated during step (v) not leached in previous steps are solubilised, forwarded for effluent treatment, and separated from leach solids; and (vii) Passing the leach solids of step (vi) to one or more washing stages wherein at least a portion of any remaining soluble impurities are separated, and whereby a purified graphite material is produced.

Preferably, the process further comprises a drying step in which the purified graphite material of step (vii) is dried, providing a dried purified graphite material. The dried purified graphite material preferably contains between 0 to 2.5% moisture, for example less than about 1% and further preferably 0.1% moisture. In one form of the invention, the purified graphite material of step (vii) will preferably contain about 40% moisture prior to the drying step.

Preferably, the purified graphite material of step (vii) has a pH of 7±2.5.

Still preferably, the purified graphite material of step (vii) is classified in or after the drying step. The purified graphite material of step (vii) is preferably classified in the drying step into multiple products having different particle size and surface area properties, for example into at least two fractions. In one form the classification utilises a dry powder classification method, for example cyclone classification.

The pelletisation step (i) preferably comprises the addition, in stepwise fashion, of caustic soda and water to the graphite material to be purified. The pellets produced in the pelletisation step (i) are preferably micro-pellets of about 2-0 mm in diameter, for example 5 mm±2 mm.

In one form of the invention, dry fines of the purified graphite material are added during the pelletisation step (i). Dry fines in the order of about 50 kg/t±25 kg/t are preferably added. The pellets produced in the pelletisation step (i) preferably have a moisture content of about 10 to 25% w/w, for example about 20% w/w.

Still preferably, the graphite material to be purified has a moisture content of up to about 25% w/w±5% w/w prior to the pelletisation step (i). The graphite material may however be dried to about 0.1-2.5% w/w moisture content prior to pelletisation to facilitate the process.

The caustic baking step (ii) is preferably undertaken at between about 150 and 300° C. and causes the caustic soda and, in particular, silicate impurity minerals to react and be rendered soluble in water and mild acid conditions.

Preferably, the caustic baking step has a residence time in the range of about 60 to 240 minutes, preferably about 120 minutes.

Still preferably, the amount of caustic soda added to the graphite material to be purified is calculated using the ratio of at least 1 mol caustic to 1 mol silicon, for example between 2.5 to 5.5 mol caustic to silicon, particularly 3.2 mol caustic: 1 mol silicon.

In one form of the invention the caustic baking step (ii) is undertaken in a rotating kiln.

The water leach step (iii) is preferably undertaken at between about 5-60° C., for example about 35° C.±5° C. Preferably, the water leach step (iii) is undertaken in a single stage. In certain circumstances, the water leach step (iii) may be undertaken in multiple, for example three, counter-current leach stages. Still further preferably, the water leach step (iii) has a retention time of between about 30 to 240 minutes.

The first sulphuric acid leach step (iv) is preferably undertaken at between about 5 to 60° C., for example about 40° C.±5° C. Still preferably, the first sulphuric acid leach step (iv) has a retention time of between about 30 to 240 minutes, for example about 120 minutes.

Preferably, impurities leached in the first sulphuric acid leach step (iv) include sodium silicate, sodium alunite, iron oxide and iron hydroxide mineral phases formed during the caustic baking step, together with any residual caustic.

Preferably, concentrated sulphuric acid is added in the first sulphuric acid leach step (iv). Impurities leached in the sulphuric acid leach step (iv) preferably include residual amounts of sodium silicate, sodium alunite, iron oxide and iron hydroxide, and titanium mineral phases not removed in step (iii). Still preferably, the residual free acid at the end of the first sulphuric leach step (iv) is in the range of about 5-75 g/L $H_2SO_4$, for example about 50 g/L±5 g/L $H_2SO_4$. The first sulphuric acid leach step (iv) preferably operates with between about 5 to 25% solids, for example about 10% solids.

The hydrofluoric acid leach step (v) is preferably undertaken at between about 5-60° C., for example about 40° C.±5° C. Preferably, impurities leached in the hydrofluoric leach step (v) include but are not limited to quartz, titanium mineral phases, and residual amounts of albite, biotite, and pyrophyllite. Still preferably, the residual free acid at the end of the hydrofluoric acid leach step (v) is in the range of about 5-75 g/L HF, for example about 25 g/L±5 g/L HF. The hydrofluoric acid leach step (v) operates with between about 5 to 25% solids, for example about 10% solids.

Preferably, the hydrofluoric acid added to the acid leach step (v) is in the range of about 20 to 70% concentration. The hydrofluoric acid concentration in the acid leach step (v) is preferably in the range of about 15-50 g/L.

Still preferably, the leach solids from the hydrofluoric leach step (v) have no remaining silicon therein, or only trace amounts thereof.

The second sulphuric acid leach step (vi) is preferably undertaken at between about 5-60° C., for example about 40° C.±5° C. Preferably, impurities leached in the second sulphuric acid leach step (vi) include precipitated fluoride phases, for example calcium fluoride, and remaining base metals. The second sulphuric acid leach step (vi) preferably operates with between about 5 to 25% solids, for example about 10% solids.

Preferably, the second sulphuric acid leach step (iv) has a retention time of between about 30 to 240 minutes, for example about 120 minutes.

Preferably, concentrated sulphuric acid is added in the second sulphuric acid leach step (vi). Still preferably, the residual free acid at the end of the second sulphuric leach step (iv) is in the range of about 5-75 g/L $H_2SO_4$, for example about 50 g/L±5 g/L $H_2SO_4$. Acid solutions from the second sulphuric acid leach step (vi) are preferably recovered and recycled to the first sulphuric acid leach step (iv) and the second sulphuric acid leach step (vi).

The washing stages of step (vii) preferably comprise a single repulp-filtration stage using deionised water, a multiple counter-current repulp-filtration stages, or, for example, five multiple counter-current repulp-filtration stages, using deionised water. Preferably, the washing stages of step (vii) operates with between about 5 to 25% solids, for example about 10% solids using three stages of counter-current repulp-filtration stages.

Preferably, liquid, residual salts, and/or acidity from the residual solids of the second sulphuric acid leach step (vi) are recovered in the washing stages of step (vii) and returned to one or both of the sulphuric acid leach steps (iv) and (vi).

Preferably, a first effluent treatment plant receives effluent from the water leach step (iii), and the two sulphuric acid leach steps (iv) and (vi). The first effluent treatment plant preferably also receives either lime or caustic soda, and iron sulphate, as either a ferric or ferrous salt. The first effluent treatment plant preferably produces a first effluent and, where lime is added, a mixed silicate-hydroxide-gypsum product.

The first effluent treatment plant preferably receives effluent bled from the first sulphuric acid leach step (iv), at a rate determined by silicon levels in that leach step. Preferably, this level is about 5 g/L silicon in the first sulphuric acid leach step (iv).

Preferably, a second effluent treatment plant receives effluent bled from the hydrofluoric leach step (v). The second effluent treatment plant preferably also receives lime and ferrous or ferric sulphate, producing a second effluent and a calcium fluoride product.

In one form of the invention the second effluent treatment plant receives aluminium hydroxide, thereby producing a second effluent and an aluminium fluoride product.

The second effluent treatment plant preferably receives effluent bled from the hydrofluoric leach step (v) at a rate determined by silicon levels in that leach step.

The first effluent and the second effluent are preferably combined to provide a combined effluent product.

Preferably, silica gel formation in the leach steps (iii), (iv) and (vi) is avoided through the bleeding of leach liquor to the effluent treatment steps. The silicon content in the leach steps (iii), (iv) and (vi) is preferably kept in the range of 2.5 to 7.5 g/L, for example below about 5 g/L, through bleeding of the leach liquor in this manner.

Preferably, dewatering is provided between leaching stages.

Preferably, the carbon recovery of the graphite material purification process is greater than about 87%, for example between about 87.3% and 96.0%.

Preferably, the Loss on Ignition (LOI) for the purified graphite material product of the process is greater than or equal to about 99.90%, for example about 99.90 to 99.97%, or 99.96 to 99.97%.

Preferably, the carbon as graphite content of the purified graphite material product of the process is greater than 99.5% w/w.

Preferably, surface area (BET) of the purified graphite material product of the process is in the range of about 5 to 10 m2/g, preferably about 7.0 m2/g±2.0 m2/g.

Preferably, the d50 of the purified graphite material product of the process is in the range of about 5 to 10 μm, preferably about 7.0 μm±2.0 μm.

In accordance with the present invention there is further provided a purified graphite material product produced in accordance with the graphite material purification process described hereinabove.

BRIEF DESCRIPTION OF THE DRAWINGS

The present invention will now be described, by way of example only, with reference to one embodiment thereof and the accompanying drawing, in which:—

BEST MODE(S) FOR CARRYING OUT THE INVENTION

The present invention provides a graphite material purification process, the process comprising the steps of:
(i) Passing a concentrate of the graphite material to be purified to a pelletisation step providing a pelletised material;
(ii) Baking the pelletised material of step (i) in caustic conditions providing a sintered product and whereby one or more impurity minerals are rendered soluble;
(iii) Passing the sintered product of step (ii) to a water leach step whereby at least a portion of the impurity minerals from step (ii) are solubilised, forwarded for effluent treatment, and separated from leach solids;
(iv) Passing the leach solids of step (iii) to a first sulphuric acid leach step wherein impurity minerals partially leached in step (iii) are solubilised, forwarded for effluent treatment, and separated from leach solids;
(v) Passing the leach solids of step (iv) to a hydrofluoric acid leach step wherein partially leached impurity minerals are solubilised, forwarded for effluent treatment, and separated from leach solids;
(vi) Passing the leach solids of step (v) to a second sulphuric acid leach step wherein impurity minerals or components precipitated during step (v) not leached in previous steps are solubilised, forwarded for effluent treatment, and separated from leach solids; and
(vii) Passing the leach solids of step (vi) to one or more washing stages wherein at least a portion of any remaining soluble impurities are separated, and whereby a purified graphite material is produced.

The process further comprises a drying step in which the purified graphite material of step (vii) is dried, providing a dried purified graphite material. The dried purified graphite material contains between 0 to 2.5% moisture, for example less than about 1% and further preferably 0.1% moisture. In one form of the invention, the purified graphite material of step (vii) will contain about 40% moisture prior to the drying step, although this moisture content is linked to dewatering and drying equipment employed by an operator. The purified graphite material of step (vii) has a pH of 7±2.5 whereby the purified graphite material is suitable for use directly in calendaring of electrodes if desired, without the need to pyrolise the purified graphite material before calendaring.

The purified graphite material of step (vii) is classified in or after the drying step. The purified graphite material of step (vii) is classified in or after the drying step into multiple products having different particle size and surface area properties, for example into at least two fractions. In one form the classification utilises a dry powder classification method, for example cyclone classification.

The pelletisation step (i) comprises the addition, in stepwise fashion, of caustic soda and water to the graphite material to be purified. The pellets produced in the pelletisation step (i) are micro-pellets of about 2-10 mm in diameter, for example 5 mm±2 mm.

In one form of the invention, where required to improve the properties of the pelletised material, dry fines of the purified graphite material are added during the pelletisation step (i). Dry fines in the order of about 50 kg/t±25 kg/t are added. The pellets produced in the pelletisation step (i) have a moisture content of about 10 to 25% w/w, for example about 20% w/w, depending upon the amount of caustic soda added. The graphite material to be purified has a moisture content of up to about 25% w/w±5% w/w prior to the pelletisation step (i). The graphite material may however be dried to between about 0.1 to 2.5% w/w moisture prior to pelletisation to facilitate the process.

The caustic baking step (ii) is undertaken at between about 150 and 300° C. and causes the caustic soda and, in particular, silicate impurity minerals to react and be rendered soluble in water and mild acid conditions. The caustic baking step has a residence time in the range of about 60 to 240 minutes, for example about 120 minutes. The amount of caustic soda added to the graphite material to be purified is calculated using the ratio of at least 1 mol caustic to 1 mol silicon, for example between 2.5 to 5.5 moles caustic to silicon, particularly 3.2 mol caustic: 1 mol silicon. The caustic baking step (ii) is undertaken, for example, in a rotating kiln.

The water leach step (iii) is undertaken at between about 5-60° C., for example about 35° C.±5° C. The water leach step (iii) is undertaken in a single leach step, although in certain circumstances it may be undertaken in multiple, for example three, counter-current leach stages. The water leach step (iii) has a retention time of between about 30 to 240 minutes.

The first sulphuric acid leach step (iv) is undertaken at between about 5 to 60° C., for example about 40° C.±5° C. with a retention time of between about 30 to 240 minutes, for example about 120 minutes. Concentrated sulphuric acid is added in the first sulphuric acid leach step (iv). Impurities leached in the sulphuric acid leach step (iv) preferably include residual amounts of sodium silicate, sodium alunite, iron oxide and iron hydroxide, and titanium mineral phases not removed in step (iii). Still preferably, the residual free acid at the end of the first sulphuric leach step (iv) is in the range of 5-75 g/L $H_2SO_4$, for example about 50 g/L±5 g/L $H_2SO_4$. The first sulphuric acid leach step (iv) preferably operates with between 5 to 25% solids, for example 10% solids.

Impurities leached in the first sulphuric acid leach step (iv) include sodium silicate, sodium alunite, iron oxide and iron hydroxide mineral phases formed during the caustic baking step, together with any residual caustic.

It is envisaged that all, or a portion of, the product of the first sulphuric acid leach step (iv) may be recycled to step (i) in order to expose it to a second baking step (ii). It is understood that this may be advantageous in addressing titanium levels, as the baking step (ii) is the stage of the process of the present invention in which titanium minerals are 'cracked' (eg. titanite and rutile).

The hydrofluoric acid leach step (v) is undertaken at between about 5-60° C., for example about 40° C.±5° C. Impurities leached in the hydrofluoric leach step (v) include but are not limited to quartz, titanium mineral phases, and residual amounts of albite, biotite, and pyrophyllite. The residual free acid at the end of the hydrofluoric acid leach step (v) is in the range of about 5-75 g/LHF, for example about 25 g/L±5 g/L HF. The hydrofluoric acid leach step (v) operates with between 5 to 25% solids, for example 10% solids.

The hydrofluoric acid added to the acid leach step (v) is in the range of about 20 to 70% concentration. The hydrofluoric acid concentration in the acid leach step (v) is preferably in the range of 15-50 g/L, depending on the grade and mineralogical composition of the starting graphite material. The leach solids from the hydrofluoric leach step (v) have substantially no, or only trace amounts of, silicon remaining therein.

The second sulphuric acid leach step (vi) is undertaken at between about 5-60° C., for example about 40° C.±5° C. Impurities leached in the second sulphuric acid leach step (vi) include precipitated fluoride phases, for example calcium fluoride, and remaining base metals. The second sulphuric acid leach step (vi) operates with between 5 to 25% solids, for example 10% solids. The second sulphuric acid leach step (iv) has a retention time of between about 30 to 240 minutes, for example about 120 minutes.

Concentrated sulphuric acid is added in the second sulphuric acid leach step (vi). The residual free acid at the end of the second sulphuric leach step (iv) is in the range of 5-75 g/L $H_2SO_4$, for example about 50 g/L±5 g/L $H_2SO_4$. Acid solutions from the second sulphuric acid leach step (vi) are recovered and recycled to the first sulphuric acid leach step (iv) and the second sulphuric acid leach step (vi).

The washing stages of step (vii) comprise multiple counter-current repulp-filtration stages, for example five multiple counter-current repulp-filtration stages, using deionised water. The washing stages of step (vii) operates with between 5 to 25% solids, for example 10% solids using three stages of counter-current repulp-filtration stages. Liquid, residual salts, and/or acidity from the residual solids of the second sulphuric acid leach step (vi) are recovered in the washing stages of step (vii) and returned to one or both of the sulphuric acid leach steps (iv) and (vi). It is envisaged that the liquid, residual salts, and/or acidity from the residual solids of the second sulphuric acid leach step (vi) may further be returned to the water leaching step (iii).

A first effluent treatment plant receives effluent from the water leach step (iii), and the two sulphuric acid leach steps (iv) and (vi). The first effluent treatment plant also receives either lime or caustic soda, and iron sulphate, as either a ferric or ferrous salt. The first effluent treatment plant produces a first effluent and, where lime is added, a mixed silicate-hydroxide-gypsum product.

The first effluent treatment plant receives effluent bled from the first sulphuric acid leach step (iv), at a rate determined by silicon levels in that leach step. This level is about 5 g/L silicon in the first sulphuric acid leach step (iv).

A second effluent treatment plant receives effluent bled from the hydrofluoric leach step (v). The second effluent treatment plant also receives lime and ferrous or ferric sulphate, producing a second effluent and a calcium fluoride product.

In one form of the invention the second effluent treatment plant receives aluminium hydroxide, thereby producing a second effluent and an aluminium fluoride product.

The second effluent treatment plant receives effluent bled from the hydrofluoric leach step (v) at a rate determined by silicon levels in that leach step.

The first effluent and the second effluent are combined to provide a combined effluent product.

Silica gel formation in the leach steps (iii), (iv) and (vi) is avoided through the bleeding of leach liquor to the effluent treatment steps. The silicon content in the leach steps (iii), (iv) and (vi) is kept in the range of 2.5 to 7.5 g/L, for example below about 5 g/L, through bleeding of the leach liquor in this manner.

Dewatering is provided between leaching stages, utilising filters and/or centrifugal decanters.

The carbon recovery of the graphite material purification process is greater than about 87%, for example between about 87.3% and 96.0%. The Loss on Ignition (LOI) for the purified graphite material product of the process is greater than or equal to about 99.90%, for example about 99.90 to 99.97%, or 99.96 to 99.97%.

The carbon as graphite content of the purified graphite material product of the process is greater than 99.5% w/w.

The surface area (BET) of the purified graphite material product of the process is in the range of about 5 to 10 $m^2/g$, for example about 7.0 $m^2/g$±2.0 $m^2/g$, though it should be understood that the surface area (BET) will be dependent to some extent on the initial starting graphite material concentrate. The $d_{50}$ of the purified graphite material product of the process is in the range of about 5 to 10 µm, for example about 7.0 µm±2.0 µm, though it should be understood that the $d_{50}$ will be dependent to some extent on the initial starting graphite material concentrate.

If desired, the graphite material concentrate may be milled prior to the pelletisation step (i), whereby it is possible to obtain a purified graphite material having a surface area (BET) of greater than or equal to about 25 $m^2/g$.

The present invention further provides a purified graphite material product produced in accordance with the graphite material purification process described herein and that is of a purity that is suitable for use in the production of LiBs.

Figure 1:
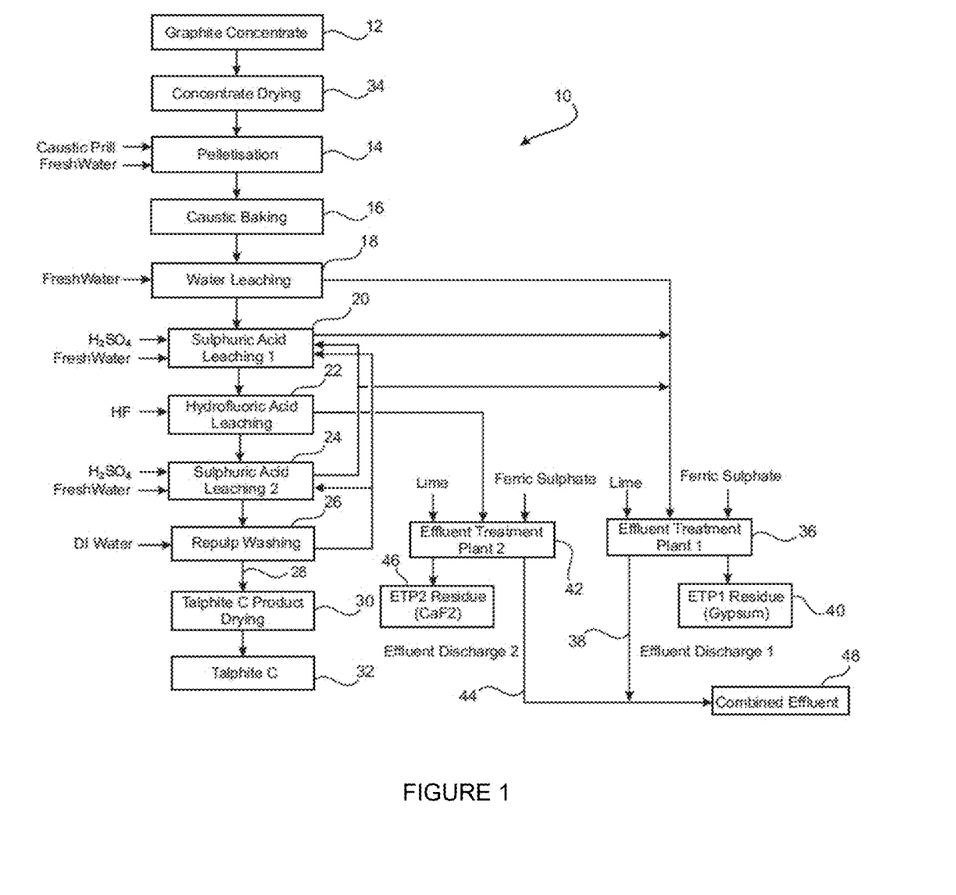
FIG. 1 is a schematic representation of a flow chart depicting a graphitic material purification process in accordance with the present invention.

In FIG. 1 there is shown a graphite material purification process 10 in accordance with the present invention, the process 10 comprising the steps of:
  (i) Passing a concentrate 12 of the graphite material to be purified to a pelletisation step 14 to provide a pelletised concentrate;
  (ii) Baking the pelletised concentrate of step (i) in caustic conditions, in a caustic baking step 16, to provide a sintered product and whereby one or more impurity minerals are rendered soluble;
  (iii) Passing the sintered product of step (ii) to a water leach step 18 whereby at least a portion of the impurity minerals from step (ii) are solubilised, forwarded for effluent treatment, and separated from leach solids;
  (iv) Passing the leach solids of step (iii) to a first sulphuric acid leach step 20 wherein impurity minerals partially leached in step (iii) are solubilised, forwarded for effluent treatment, and separated from leach solids;
  (v) Passing the leach solids of step (iv) to a hydrofluoric acid leach step 22 wherein partially leached impurity minerals are solubilised, forwarded for effluent treatment, and separated from leach solids;
  (vi) Passing the leach solids of step (v) to a second sulphuric acid leach step 24 wherein impurity minerals or components precipitated during step (v) and not leached in previous steps are solubilised, forwarded for effluent treatment, and separated from leach solids; and
  (vii) Passing the leach solids of step (vi) to one or more washing stages 26 wherein at least a portion of any remaining soluble impurities are separated, and whereby a purified graphite material 28 is produced.

The process further comprises a drying step 30 in which the purified graphite material 28 of step (vii) is dried, providing a dried purified graphite material 32 (here also referenced as Talphite-C™). It is intended that whilst the purified graphite material 28 of step (vii) will contain about 40% moisture prior to the drying step, the dried purified graphite material contains between 0 to 2.5% moisture, for example less than about 0.1% moisture. The purified graphite material 28 of step (vii) has a pH of 7±2.5 when repulped in water, whereby the purified graphite material is suitable for use directly in calendaring of electrodes (not shown).

The purified graphite material 28 of step (vii) is classified in the drying step 30, into at least two fractions, for example using cyclone classification. The two fractions would typically include fine and coarse fractions.

The graphite material concentrate 12 has a moisture content of up to about 26 to 28% w/w. This concentrate 12 is first passed to a concentrate drying step 34, for example a flash drying stage or rotary drum drier. Whilst a proportion of the material 12 exits in flue gas it is recovered and reintroduced to the dried concentrate that is passed to the pelletisation step 14.

The pelletisation step 14 comprises the addition, in stepwise fashion, of caustic soda, in the form of caustic prill, and water to the graphite material to be purified. The pellets produced in the pelletisation step 14 are micro-pellets of about 2-10 mm in diameter, for example 5 mm±2 mm.

Dry fines of the purified graphite material are added during the pelletisation step 14, for example dry fines in the order of about 50 kg/t are added. The dry fines of the purified graphite material are sourced from the drying step 30. The pellets produced in the pelletisation step 14 have a moisture content of about 13 to 24% w/w, for example about 20% w/w.

The caustic baking step 16 is undertaken at between about 150-300° C. and causes the caustic soda and, in particular, silicate impurity minerals to react and be rendered soluble in water. The caustic baking step 16 has a residence time of greater than about 60 minutes, for example about 120 minutes. The amount of caustic soda added to the graphite material to be purified is calculated using the ratio of at least 1 mol caustic to 1 mol silicon, for example 3.2 mol caustic: 1 mol silicon. The caustic baking step 16 is undertaken, for example, in a rotating kiln.

The water leach step 18 is undertaken at between about 5-60° C., for example about 35° C. The water leach step 18 is undertaken in either a single or in multiple stages, for example up to three, counter-current leach stages and has a retention time of between about 30 to 240 minutes.

The first sulphuric acid leach step 20 is undertaken at between about 25-50° C., for example about 40° C., with a retention time of between about 30 to 240 minutes, for example 120 minutes. Concentrated sulphuric acid is added in the first sulphuric acid leach step 20 and the residual free acid at the end of the first sulphuric leach step (iv) is about 50 g/L $H_2SO_4$. The first sulphuric acid leach step (iv) operates with between 5 to 25% solids, for example 10% solids.

Impurities leached in the first sulphuric acid leach step 20 include sodium silicate, sodium alunite, iron oxide and iron hydroxide mineral phases, together with any residual caustic.

The hydrofluoric acid leach step 22 is undertaken at between about 30-45° C. Impurities leached in the hydrofluoric leach step 22 include quartz, titanium mineral phases, and residual amounts of albite, biotite, and pyrophyllite. The residual free acid at the end of the hydrofluoric acid leach step 22 is about 25 g/L HF. The hydrofluoric acid leach step (v) operates with between 5 to 25% solids, for example 10% solids.

The hydrofluoric acid added to the leach step 22 is in the range of about 20 to 70% concentration and the hydrofluoric acid concentration in the acid leach step 22 is in the range of 15-50 g/L. The leach solids from the hydrofluoric leach step 22 have substantially no silicon, or only trace amounts thereof, remaining therein.

The second sulphuric acid leach step 24 is undertaken at between about 25-50° C., for example about 40° C. Impurities leached in the second sulphuric acid leach step 24 include but are not limited to precipitated fluoride phases, for example calcium fluoride, and remaining base metals. The second sulphuric acid leach step 24 has a retention time of between about 30 to 240 minutes, for example about 120 minutes.

Concentrated sulphuric acid is added in the second sulphuric acid leach step 24 and the residual free acid at the end of the second sulphuric acid leach step 24 is about 50 g/L. The second sulphuric acid leach step (vi) operates with between 5 to 25% solids, for example 10% solids.

The washing stages of step 26 comprise multiple counter-current repulp-filtration stages, for example three multiple counter-current repulp-filtration stages, using deionised water. The washing stages of step 26 operates with between 5 to 25% solids, for example 10%. Water, residual salts, and/or acidity from the residual solids of the second sulphuric acid leach step 24 are recovered in the washing stages of step 26 and returned to one or both of the sulphuric acid leach steps 20 and 24. It is envisaged that the liquid, residual salts, and/or acidity from the residual solids of the second sulphuric acid leach step (vi) may further be returned to the water leaching step (iii).

It is envisaged that carbonation may be incorporated during the washing stages of step 26, through the addition of sodium bicarbonate or the bubbling of carbon dioxide with caustic soda for pH control. This will help to neutralise carry-over acid from the second sulphuric acid leach step 24 and reduce the number of counter current washing steps required.

A first effluent treatment plant 36 receives effluent from the water leach step 18, and the two sulphuric acid leach steps 20 and 24. The first effluent treatment plant 36 also receives lime and iron sulphate, for example ferric sulphate, producing a first effluent 38 and a gypsum product 40. The volume of gypsum precipitation, or residue, may be minimised through use of caustic soda rather than lime in this step.

A second effluent treatment plant 42 receives effluent bled from the hydrofluoric leach step 22. The second effluent treatment plant 42 also receives lime and iron sulphate, for example ferric sulphate, producing a second effluent 44 and a calcium fluoride product 46.

In one form of the invention the second effluent treatment plant receives aluminium hydroxide, thereby producing a second effluent and an aluminium fluoride product.

The second effluent treatment plant 42 receives effluent bled from the hydrofluoric leach step 22 at a rate determined by silicon levels in that leach step 22.

The first effluent 38 and the second effluent 44 may subsequently be combined to provide a combined effluent product 48.

Silica gel formation in the leach steps 18, 20 and 24 is avoided through the bleeding of leach liquor to the effluent treatment steps. The silicon content in the leach steps 18, 20 and 24 is kept below about 5 g/L through bleeding of the leach liquor in this manner.

Dewatering is provided between leaching stages, utilising filters and/or centrifugal decanters, as required.

The carbon recovery of the graphite material purification process 10 of the present invention is greater than about 87%, for example between about 87.3% and 96.0%. The Loss on Ignition (LOI) for the purified graphite material product of the process is greater than or equal to about 99.90%, for example about 99.90 to 99.97%, or 99.96 to 99.97%.

The carbon as graphite content of the purified graphite material product of the process 10 of the present invention is greater than 99.5% w/w.

The surface area (BET) of the purified graphite material product of the process 10 of the present invention is in the range of about 5 to 10 m$^2$/g, for example about 7.0 m$^2$/g±2.0 m$^2$/g. The $d_{50}$ of the purified graphite material product of the process 10 of the present invention is in the range of about 5 to 10 μm, for example about 7.0 μm±2.0 μm, though it should be understood that the $d_{50}$ will be dependent to some extent on the initial starting graphite material concentrate.

The process of the present invention may be better understood with reference to the following non-limiting examples.

EXAMPLES

The natural graphite precursor or ore used for the present investigation was extracted from the Vittangi graphite mine in the County of Norrbotten in northern Sweden. This natural graphite source is characterised by hard particles having a very narrow distribution, with microcrystalline flake. The mineral phases can be broadly divided into two major categories:

(i) Disseminated minerals within the graphite matrix host rock; and
(ii) Discrete and/or Vein minerals existing either as liberated minerals or composites at grain boundaries.

The mineral phases that exist in these two categories are summarised below in Table 1 together with an approximation of their relative abundance.

TABLE 1

Vittangi Ore Disseminated and Discrete Mineral Phases

| Disseminated Minerals* | | Discrete/Vein Minerals* | |
|---|---|---|---|
| Mineral | Abundance | Mineral | Abundance |
| Biotite | 10-15% | Albite | 15-25% |
| Tremolite | 3-7% | Marialite | 5-10% |
| Pyrophyllite | 3-7% | Quartz | 5-10% |
| Pyrrhotite | 3-7% | Meionite | 3-7% |
| Pyrite | 1-3% | K-Feldspar | 0.2-1.5% |
| Calcite | 1-3% | Rutile | 0.2-1.5% |
| Siderite | 1-2% | Apatite | 0.1-0.5% |
| Titanite | 0.5%-1.5% | | |
| Hematite | 0.5%-1.5% | | |
| Chalcocite | 0.01-0.05% | | |

*Graphite content range - between 20-30% in ore, semi-quantitative XRD.

Concentrates have been prepared by the Applicants from the above ore and used as the basis for computer models (utilising METSIM™ software) of the process of the present invention. The assumed mineralogy of the purification plant feed employed in the METSIM modelling is summarised in Table 2 below, showing all the carbon present in the form of graphitic carbon ($C_g$).

TABLE 2

METSIM Model Purification Plant Feed Mineralogy Assumptions

| Mineral Phase | Formula | Weight Percent (%) |
|---|---|---|
| Graphite | $C_g$ | 89.50 |
| Biotite | $KMg_{2.5}Fe^{2+}{}_{0.5}AlSi_3O_{10}(OH)_{1.75}F_{0.25}$ | 1.60 |
| Tremolite | $Ca_2Mg_5(Si_8O_{22})(OH)_2$ | 1.00 |
| Pyrophyllite | $Al_2Si_4O_{10}(OH)_2$ | 1.85 |
| Titanite | $CaTiSiO_5$ | 0.20 |
| Pyrrhotite | FeS | 0.20 |
| Pyrite | $FeS_2$ | 2.20 |
| Chalcocite | $Cu_2S$ | 0.02 |
| Rutile | $TiO_2$ | 0.03 |
| Scapolite | | |
| Marialite | $Na_4Al_3Si_9O_{24}Cl$ | 0.25 |
| Meionite | $Ca_4Al_6Si_6O_{24}(CO_3)$ | 0.01 |
| Albite | $NaAlSi_3O_8$ | 1.90 |
| Quartz | $SiO_2$ | 1.10 |
| K-Feldspar | $KAlSi_3O_8$ | 0.05 |

Graphite concentrate undergoes caustic baking in a caustic bake step to convert gangue minerals to sodium salts, followed by multiple stages of water and acid leaching and repulping/washing to solubilise and remove gangue species from the solid graphite phase. The more dilute process waters generated in the latter stages of the washing step are recycled to up-stream repulping and filter cake washing duties flowing counter-current to the graphite material or concentrate in the process, to maximise the washing efficiency of the raw water input to the process.

The intended functioning of each stage of the process of the present invention is described hereinafter. Solution and slurry flows information described is presented for illustrative purposes only.

Concentrate Drying Step

This stage accepts moist concentrate filter cake in bulk bags and produces loose solids dried to 0.5% w/w moisture, which is transferred to the caustic baking step by screw feeder.

The flash dryer feed bin, fitted with bag-breaker, receives bags of moist concentrate filter cake via hoist from a suitable delivery lay-down pad. Loose filter cake is transferred from the bottom of the feed bin to the flash dryer by screw feeder operating at a constant rate.

Concentrate is flash dried and conveyed by screw feeder to the dry concentrate bin, from where it is advanced to the caustic baking step/roasting by screw feeder. An estimated 12.5% of concentrate exits the dryer in the flue gas (post dust cyclone) and reports to a baghouse. An estimated 99.5% of solids reporting to the baghouse are captured and directed to the dry concentrate bin.

It is envisaged that it may be possible to control final moisture to a higher value (closer to but below pellet moisture) to avoid the inefficiency of evaporating moisture that then must be added back in.

Caustic Baking Step and Pelletisation Step

The caustic baking/roasting step combines dry concentrate with sodium hydroxide to form pellets with a mean diameter of approximately 5 mm, which are then feed to a kiln. High temperature causes the conversion of silicates and other gangue minerals to sodium salts.

Dry concentrate, caustic (sodium hydroxide) prill and water are fed to a pelletising package to produce pellets at a target 15% w/w moisture suitable for feeding to the roasting kiln. Dry graphite product fines from the product drying baghouse bin are also added to the formed pellets to reduce their tendency to agglomerate, in a step that may be referred to as 'curing'. Graphite fines addition is at a ratio of 5% w/w of uncured pellets.

Cured graphite pellets are transferred to the direct fired rotary kiln where their temperature is raised to 200° C. for 2 hours. The Applicant's test work has shown that approximately 95% of gangue minerals are converted to sodium salts, and about 13.7% of graphite is lost to reaction with caustic in this process. Five percent of solids has been assumed to report to flue gas as dust.

Flue gas is directed to a baghouse in which 99.5% solid are assumed to be captured. Baghouse solids are combined with kiln discharge solids ('clinker') into the clinker bin, from which a screw feeder transfers clinker to the next processing area.

Water Leaching Step

The water leach step solubilises sodium salts and separates them from remaining solids in three stages of leaching, filtration, washing and repulping.

Sintered material is transferred by screw feeder to a stage 1 duty repulping tank where it is mixed with stage 2 filtrate. The other stage 1 repulping tank operates in continuous feeding mode, with the duty feed pump discharging the graphite slurry to the first of two baffled, agitated stage 1 leach tanks connected in series by gravity overflow. Precipitated salts dissolve and slurry overflows the final leach tank to the stage 1 filter feed tank.

Stage 1 batch press filters are fed from the filter feed tank by centrifugal slurry pump. Filter cakes are washed with stage 2 filtrate fed by a dedicated pump. Stage 1 primary and wash filtrates are collected in a single tank ahead of being transferred by pump to the effluent treatment plant 1.

Stage 1 filter cake is transferred by screw feeder to the stage 2 duty repulp tank where it is mixed with stage 3 filtrate. The other stage 2 repulping tank operates in continuous feeding mode, with the duty feed pump discharging graphite slurry to the first of two baffled, agitated leach tanks connected in series by gravity overflow. Precipitated salts dissolve and slurry overflows the final leach tank to the stage 2 filter feed tank.

Stage 2 batch press filters are fed from the stage 2 filter feed tank by centrifugal slurry pump. Filter cakes are washed with stage 3 filtrate fed by a dedicated pump. Stage 2 primary and wash filtrates are collected in the stage 2 filtrate tank ahead of transfer by dedicated pumps to stage 1 repulping and filter cake washing duties as required.

Stage 2 filter cake is transferred by screw feeder to the stage 3 duty repulp tank where it is mixed with raw water. The other stage 3 repulping tank operates in continuous feeding mode, with the duty feed pump discharging graphite slurry to the first of two baffled, agitated leach tanks connected in series by gravity overflow. Precipitated salts dissolve and slurry overflows the final leach tank to the stage 3 filter feed tank.

Stage 3 batch press filters are fed from the stage 3 filter feed tank by centrifugal slurry pump. Filter cakes are washed with raw water. Stage 3 primary and wash filtrates are collected in the stage 3 filtrate tank ahead of transfer by dedicated pumps to stage 2 repulping and filter cake washing duties as required.

Stage 3 filter cake is transferred by screw feeder to the next processing area.

First Sulphuric Leaching Step

The first sulphuric acid leach step area partially solubilises gangue minerals and separates them from remaining solids.

Water leach stage 3 filter cake is transferred by screw feeder to the duty acid leach repulping tank where it is mixed with leach filtrate and raw water to a pulp density of 12% w/w solids. The other repulping tank operates in continuous feeding mode, with the duty feed pump discharging acidic graphite slurry to the first of three baffled, agitated acid leach tanks connected in series by gravity overflow. 70% sulphuric acid is added to the leach tanks to maintain 50 g/L background or residual acid concentration. Gangue minerals dissolve and slurry overflows the final leach tank to the filter feed tank.

Acid leach batch press filters are fed from the filter feed tank by centrifugal slurry pump. Filter cakes are washed with water leach filtrate fed by a dedicated pump. Acid leach primary and wash filtrates are collected in a single tank from which solution is partially recycled by dedicated pump to the acid leach repulp tank and the remainder transferred by pump to the first effluent treatment plant activated by a level controller in the transfer tank.

Acid leach filter cake is transferred by screw feeder to the water leach duty repulp tank where it is combined with a mixture of raw water and final water repulp filtrate. The other water leach repulping tank operates in continuous feeding mode, with the duty feed pump discharging graphite slurry to the first of two baffled, agitated leach tanks connected in series by gravity overflow. Precipitated salts dissolve and slurry overflows the final leach tank to the water leach filter feed tank.

Water leach batch press filters are fed from the water leach filter feed tank by centrifugal slurry pump. Filter cakes are washed with raw water. Primary and wash filtrates are collected in the water leach filtrate tank ahead of transfer by dedicated pump to acid leach filter cake washing as required, with excess water pumped to the first effluent treatment plant.

Final washed filter cake is transferred by screw feeder to the next processing area.

Hydrofluoric Acid Leach Step

The hydrofluoric acid leach step further solubilises silicate gangue minerals and separates them from remaining solids.

First sulphuric acid leach filter cake is transferred by screw feeder to the duty acid leach repulping tank where it is mixed with leach filtrate and raw water to a pulp density of 11% w/w solids. The other repulping tank is in continuous feeding mode, with the duty feed pump discharging acidic graphite slurry to the first of three baffled, agitated acid leach tanks connected in series by gravity overflow. 70% hydrofluoric acid is added to the leach tanks to maintain 25 g/L background acid concentration. Gangue minerals dissolve and slurry overflows the final leach tank to the filter feed tank.

Acid leach batch press filters are fed from the filter feed tank by centrifugal slurry pump. Filter cakes are washed with water leach filtrate fed by a dedicated pump. Acid leach primary and wash filtrates are collected in a single tank from which solution is partially recycled by dedicated pump to the acid leach repulp tank and the remainder transferred by pump to the second effluent treatment plant, activated by a level controller in the transfer tank.

Acid leach filter cake is transferred by screw feeder to the water leach duty repulp tank where it is combined with raw water. The other water leach repulping tank operates in continuous feeding mode, with the duty feed pump discharging graphite slurry to the first of two baffled, agitated leach tanks connected in series by gravity overflow. Precipitated salts dissolve and slurry overflows the final leach tank to the water leach filter feed tank.

Water leach batch press filters are fed from the water leach filter feed tank by centrifugal slurry pump. Filter cakes are washed with raw water. Primary and wash filtrates are collected in the water leach filtrate tank ahead of transfer by dedicated pump to acid leach filter cake washing as required, with excess water pumped to the second effluent treatment plant.

Final washed filter cake is transferred by screw feeder to the next processing area.

Second Sulphuric Leaching Step

The second sulphuric acid leach step principally solubilises the calcium fluoride precipitates generated in the previous area. An important consideration in this area is to ensure that calcium sulphate solubility is not exceeded, which would lead to the formation of gypsum precipitates and cause dilution of the graphite. This is achieved through careful control of the water balance and pulp density parameters.

Washed hydrofluoric acid leach filter cake is transferred by screw feeder to the duty second sulphuric acid leach step repulping tank where it is mixed with leach filtrate and process water to a pulp density of 12% w/w solids. The other repulping tank operates in continuous feeding mode, with the duty feed pump discharging acidic graphite slurry to the first of three baffled, agitated leach tanks connected in series by gravity overflow. 70% sulphuric acid is added to the leach tanks to maintain 25 g/L background/residual acid concentration. Fluoride precipitates dissolve and slurry overflows the final leach tank to the filter feed tank.

Batch press filters are fed from the filter feed tank by centrifugal slurry pump. Filter cakes are washed with process water fed by a dedicated pump. Acid leach primary and wash filtrates are collected in a single tank from which solution is partially recycled by dedicated pump to the acid leach repulp tank, partially recycled to the first sulphuric acid leach duty repulp tank, and the remainder transferred by pump to the first effluent treatment step.

Filter cake is transferred by screw feeder to the next processing area.

Water Repulp Washing Step

The final water repulping step is composed of three stages of repulping, continued mixing and filtration. This provides a final opportunity to remove dissolved gangue elements from the liquid contained in the interstitial voids of graphite filter cake and from the liquid films surrounding each graphite particle. Any dissolved species remaining after this stage will become part of the solid phase due to evaporation of water in the product drying step.

Acid leached filter cake is transferred by screw feeder to the stage 1 duty repulping tank where it is mixed with stage 2 filtrate. The other stage 1 repulping tank is in continuous feeding mode, with the duty feed pump discharging graphite slurry to the first of two baffled, agitated stage 1 mixing tanks connected in series by gravity overflow. Dissolved solids transfer to bulk solution by diffusion and slurry overflows the final mixing tank to the stage 1 filter feed tank.

Stage 1 batch press filters are fed from the filter feed tank by centrifugal slurry pump. Filter cakes are washed with demineralised water fed by a dedicated pump. Stage 1 primary and wash filtrates are collected in a single process water tank ahead of transfer by dedicated pumps to upstream repulping and washing duties.

Stage 1 filter cake is transferred by screw feeder to the stage 2 duty repulp tank where it is mixed with stage 3 filtrate. The other stage 2 repulping tank operate in continuous feeding mode, with the duty feed pump discharging graphite slurry to the first of two baffled, agitated mixing tanks connected in series by gravity overflow. Dissolved solids transfer to bulk solution by diffusion and slurry overflows the final mixing tank to the stage 2 filter feed tank.

Stage 2 batch press filters are fed from the stage 2 filter feed tank by centrifugal slurry pump. Filter cakes are washed with demineralised water fed by a dedicated pump. Stage 2 primary and wash filtrates are collected in the stage 2 filtrate tank ahead of partial recycle by dedicated pump to stage 1 repulping, with the remainder advancing to the process water tank.

Stage 2 filter cake is transferred by screw feeder to the stage 3 duty repulp tank where it is mixed with demineralised water. The other stage 3 repulping tank is in continuous feeding mode, with the duty feed pump discharging graphite slurry to the first of two baffled, agitated mixing tanks connected in series by gravity overflow. Dissolved solids transfer to bulk solution by diffusion and slurry overflows the final mixing tank to the Stage 3 filter feed tank.

Stage 3 batch press filters are fed from the stage 3 filter feed tank by centrifugal slurry pump. Filter cakes are washed with demineralised water. Stage 3 primary and wash filtrates are collected in the stage 3 filtrate tank ahead of partial recycle by dedicated pump to stage 2 repulping, with the remainder advancing to the process water tank.

Stage 3 filter cake is transferred by screw feeder to the next processing area.

Product Drying Step

The drying step dries refined graphite filter cake to 0.5% w/w moisture in a flash dryer, producing a loose, dry, refined graphite suitable for feeding to a subsequent plant for manufacture of anodes.

The flash dryer receives moist refined graphite filter cake by screw feeder. Concentrate is flash dried and conveyed by screw feeder to the dry product bin. An estimated 12.5% of concentrate exits the dryer in the flue gas (post dust cyclone) and reports to a baghouse. An estimated 99.5% of solids reporting to the baghouse is captured and directed in the main to the dry product bin, with a small recycle to the pelletisation step for pellet curing.

First Effluent Treatment Plant

The first effluent treatment plant processes sulphate waste solutions to generate a liquid effluent containing primarily sodium and calcium sulphate and a solid moist filter cake containing primarily gypsum and metal hydroxides, for waste disposal.

Waste solutions are directed to a baffled and agitated neutralisation tank in which pH equilibrates to ~pH 6, by addition of sulphuric acid if required to maintain the desires pH set-point.

pH-stabilised solution overflows the neutralisation tank to the ferric addition tank. Also baffled and agitated, ferric sulphate solution is dosed to this tank to achieve 1 g/L iron in slurry. Depending on the natural pH exiting neutralisation, ferric iron may precipitate in this tank or in a later stage.

Ferric-dosed slurry overflows the ferric addition tank into the first of three baffled, agitated precipitation tanks. Lime slurry is dosed into each tank as required to maintain a target pH of 12.0. Dissolved salts other than sodium sulphate are almost completely hydrolysed and precipitate as hydroxides. Calcium sulphate is generated by the reaction of lime with sulphuric acid, with gypsum precipitating at the calcium sulphate solubility limit. Slurry overflows the last precipitation reactor to a thickener. Diluted flocculant is dosed into and mixed with the slurry as it enters the feedwell such that fast-settling flocs are formed. The mixed gypsum and metal hydroxide precipitate settles while clear solution overflows the thickener to an overflow tank.

The first effluent treatment plant precipitation train will be operated as a high-density sludge plant to support the formation of a fast-settling solid phase. The rate of solids generation is low, requiring a high rate of thickener underflow recycle to maintain the target 10% w/w solids in thickener feed slurry. It is envisaged therefore that the duty underflow pump will operate in full recycle for approximately 85% of plant up-time, and discharge to the filter feed tank to draw down thickener bed level the remainder of the time.

The batch press filter is fed periodically from the filter feed tank by centrifugal slurry pump and filtrate is advanced to the thickener overflow tank for discharge.

Second Effluent Treatment Plant

The second effluent treatment plant processes fluoride waste solutions to generate a liquid effluent containing primarily calcium sulphate and a filter cake containing primarily calcium fluoride, gypsum, and metal hydroxides, for disposal.

Waste solution is directed to a baffled and agitated ferric addition tank, to which ferric sulphate solution is dosed to achieve 1 g/L iron in slurry. Due to the anticipated low pH in this tank, ferric iron will remain soluble.

Ferric-dosed slurry overflows the ferric addition tank into the first of three baffled, agitated precipitation tanks. Lime slurry is dosed into each tank as required to maintain a target pH of 12.0 in the last tank. Dissolved salts other than sodium sulphate are almost completely hydrolysed and precipitate as hydroxides. Insoluble calcium fluoride is generated by the reaction of lime with hydrofluoric acid and calcium sulphate is generated by the reaction of lime with sulphuric acid, with gypsum precipitating at the calcium sulphate solubility limit. Slurry overflows the last precipitation reactor to a thickener. Diluted flocculant is dosed into and mixed with the slurry as it enters the feedwell such that fast-settling flocs are formed. The mixed calcium fluoride, gypsum and metal hydroxide precipitate settles while a clear solution overflows the thickener to an overflow tank.

The second effluent treatment plant precipitation train will be operated as a high-density sludge plant to support the formation of a fast-settling solid phase. The rate of solids generation is low, requiring a high rate of thickener underflow recycle to maintain the target 10% w/w solids in thickener feed slurry. It is envisaged therefore that the duty underflow pump will operate in full recycle for approximately 85% of plant up-time, and discharge to the filter feed tank to draw down thickener bed level the remainder of the time.

The batch press filter is fed periodically from the filter feed tank by centrifugal slurry pump and filtrate is advanced to the thickener overflow tank for discharge.

Further testing in respect of aspects of the process of the present invention have been undertaken.

Production data for Talphite C™ material, where the final purity of ≥99.9% LOI was achieved, has been summarised in the following Table 3. The data also suggests that the there is a reduction in surface area (BET) after purification, thought by the Applicants to be most likely the result of the removal of impurity fines through the purification process.

TABLE 3

Selected High Purity Talphite C ™ Products Purification Data

| | Feed (Concentrate) | | Product (Talphite C ™) | | |
|---|---|---|---|---|---|
| Test | Grade (% w/w Cg) | BET (m2/g) | LOI (% w/w) | BET (m2/g) | Recovery (%) |
| 1 | 91.9 | 12.6 | 99.90 | 9.9 | 81.6 |
| 2 | 80.7 | 8.1 | 99.90 | 7.1 | 87.1 |
| 3 | 81.2 | 8.9 | 99.94 | 6.5 | 77.9 |
| 4 | 75.6 | 9.6 | 99.91 | 6.5 | 82.5 |

Baseline Purification of Selected GTK Concentrate Samples

Three graphite material concentrate samples were purified in the laboratory according to the following conditions:
(i) Caustic Baking—4 hours at 250° C. with NaOH:Si molar ratio of 5.2.
(ii) Water Leaching—3 consecutive water leaching steps operating at 15° C. for 2 hours, 1 hour and 30 minutes, respectively.
(iii) Sulphuric Acid Leaching (Stage 1)—4 hours at 250 kg/t acid addition operating at 15° C.
(iv) Hydrofluoric Acid Leaching—4 hours at 300 kg/t acid addition operating at 15° C.
(v) Sulphuric Acid Leaching (Stage 2)—4 hours at 250 kg/t acid addition operating at 15° C.
(vi) Water Repulping—7 stages each 30 minutes operating at 15° C.

Key metallurgy data are summarised in the following Table 4.

TABLE 4

Purification Data for Concentrate Material

| | Feed | | Purified Product | | |
|---|---|---|---|---|---|
| Sample | Ref | Cg Grade (%) | Test | Carbon Yield (%) | LOI (%) |
| 1 | — | 75.4 | 9 | 87.4 | 99.92 |
| 4 | — | 83.9 | 11 | 84.4 | 99.89 |
| 11 | — | 89.9 | 101 | 87.8 | 99.95 |

Scaling up to production scale (~150 kg scale) improved the carbon recovery to 95.7% for sample 1 up from 87.4% obtained in the laboratory. Carbon losses were lower in the larger scale production runs compared to the laboratory tests. The final purified product had a surface area of 6.4 m²/g.

Optimisation of Acid Leaching Stages

Optimisation of the acid leaching conditions showed it was possible to reduce the residence time significantly for these steps whilst still maintaining high purity. Test work results are summarised below in Table 5. Baking, water leaching and repulp washing steps remained the same as the baseline conditions described hereinabove, whilst the acid leaching steps were run at 15° C.

TABLE 5

Acid Leaching Optimisation Data

| Test | H₂SO₄ Leach-1 | | HF Leach | | H₂SO₄ Leach-2 | | Purity |
| | Time (h) | Acid (kg/t) | Time (h) | Acid (kg/t) | Time (h) | Acid (kg/t) | LOI (%) |
| --- | --- | --- | --- | --- | --- | --- | --- |
| 9 | 4 | 250 | 4 | 300 | 4 | 250 | 99.92 |
| 22 | 1 | 250 | 1 | 300 | 1 | 250 | 99.91 |
| 23 | 2 | 250 | 12 | 300 | 2 | 250 | 99.91 |
| 30 | 1 | 125 | 1 | 150 | 1 | 125 | 99.81 |

Reducing the acid addition to 50% and residence time to 25% resulted in lower purity, below acceptable levels.

Further Optimisation of Acid Leaching Stages

Baseline purification conditions failed to yield the minimum LOI purity target for one concentrate sample triggering optimisation test work for this sample focusing on temperature of the leaching steps. This test work also coincided with a period during the production runs treating concentrate material where the temperature conditions in the building were 5-10° C. due to winter conditions. Under these conditions, two batches returned LOI values of 99.88% and 99.89%. However, on heating the solutions to around 20° C. and retreating the batches, the purity target was restored. This observation has highlighted the sensitivity of the purification process to temperature variations. Results are summarised in Table 6 below.

TABLE 6

Further Optimisation of Purification Conditions

| | Baking Conditions | | | Leaching | Product | |
| Test | Time (h) | Temp (° C.) | NaOH (kg/t) | Temp (° C.) | Carbon Yield (%) | LOI (%) |
| --- | --- | --- | --- | --- | --- | --- |
| 11 | 4 | 250 | 182 | 15 | 84.4 | 99.89 |
| 14 | 4 | 250 | 182 | 30 | 88.4 | 99.91 |
| 19 | 4 | 250 | 182 | 45 | 87.0 | 99.92 |
| 16 | 4 | 250 | 230 | 30 | 87.0 | 99.92 |

Through the application of elevated temperature leach conditions (25-35° C.) during larger scale production purification of this material a final LOI purity of 99.9% was achieved with an overall carbon recovery of 91.3%.

HF Acid Leaching Using Recycled Solutions

A series of tests have been completed to simulate recycling HF leach liquors with varying compositions to assess the impact on purification efficiency.

These tests confirmed that it was possible to achieve a LOI purity target>99.90% even with elevated levels of silicon, potassium, titanium, aluminium and iron in the starting leach solution. A recycled liquor with a fluoride ion concentration of ≥55 g/l F ions and/or HF concentration of ≥60 g/l will be required to achieve the purity targets when recycling leach liquors. Key test work results are summarised in Table 7 below.

TABLE 7

HF Liquor Recycle Purification Test Results

| Parameter Starting Leach Solution | Units | Test 2 | Test 3 | Test 4 | Test 5 |
| --- | --- | --- | --- | --- | --- |
| HF | (g/L) | 60.0 | 39.2 | 61.6 | 64.6 |
| F | (g/L) | 57.0 | 37.8 | 55.7 | 61.0 |
| SO4 | (mg/L) | — | 650 | 2500 | 2600 |
| Si | (mg/L) | — | 1800 | 6800 | 4700 |
| K | (mg/L) | — | 530 | 1080 | 3000 |
| Ti | (mg/L) | — | 220 | 890 | 870 |
| Al | (mg/L) | — | 120 | 480 | 590 |
| Na | (mg/L) | — | 48 | 190 | 240 |
| Fe | (mg/L) | — | 34 | 140 | 160 |
| Purified Product LOI | (% w/w) | 99.94 | 99.85 | 99.91 | 99.94 |

Characterisation of Purified Graphite Samples

Detailed assay and characterisation information has been collated and is summarised in Table 8 below for Talphite C™ products generated by the Applicant in laboratory trials.

TABLE 8

Talphite C ™ Product Purity and Characterisation Data

| Parameter | Units | Talphite C Sample 1 | Talphite C Sample 2 | Talphite C Sample 3 |
| --- | --- | --- | --- | --- |
| Carbon Recovery (average) | (%) | 87.8 | 87.3 | 91.1 |
| LOI | (% w/w) | 99.95 | 99.92 | 99.93 |
| Cg | (% w/w) | >99.5 | >99.5 | >99.5 |
| ST | (g/t) | <20 | 300 | 71 |
| Si | (g/t) | 27 | 160 | 25 |
| Fe | (g/t) | <5 | 35 | 36 |
| Al | (g/t) | 35 | 74 | 19 |
| Ti | (g/t) | 82 | 150 | 160 |
| Ca | (g/t) | 24 | <5 | 12 |
| Cu | (g/t) | 5 | 8 | 7 |
| F | (g/t) | <30 | <50 | 60 |
| Mg | (g/t) | 9 | 6 | 7 |
| K | (g/t) | <5 | <5 | <5 |
| BET Measurement | (m2/g) | 8.42 | 7.79 | 6.40 |
| d80 | (μm) | 9.8 | 9.3 | 9.7 |
| d50 | (μm) | 6.3 | 5.8 | 5.9 |
| d20 | (μm) | 3.6 | 3.2 | 3.3 |
| Bulk Density | (kg/m3) | 318 | 280 | 250 |
| Tap Density | (kg/m3) | 538 | 500 | 483 |
| Angle of Repose | (°) | 37 | 44 | 44 |

Larger Scale Purification Trails

The Applicant has successfully purified graphite material concentrate samples at larger scale (~150 kg batches of moist filter cake), confirming the results from laboratory scale tests and scale up of the process. Carbon recovery improved to 90% to 96% compared to the laboratory tests whilst still achieving an LOI purity target of ≥99.90%.

The following Table 9 summarises production data.

TABLE 9

Larger Scale Talphite C ™ Pilot Production

| | Feed | | Talphite C ™ Product | |
|---|---|---|---|---|
| Test | Cg (% w/w) | LOI (%) | Cg Yield (%) | Weight (kg) |
| M9854B/21 | 75.4 | 99.91 | 95.7 | 87.0 |
| M9854B/31 | 75.4 | 99.90 | 90.0 | 139.6 |
| M9854C/12 | 83.9 | 99.90 | 91.3 | 91.6 |

Pelletisation and Rotary Kiln Baking Pilot Trials

Pelletisation and rotary kiln baking trials have been undertaken by the Applicants.

Pelletisation tests were carried out with a 5 L Eirich Intensive Mixer (Model R01) to establish operating conditions to prevent the formation of clusters, reduce the stickiness of the pellets and target pellets in the range of 2-10 mm.

Test work showed that the addition of dry fines during the pelletisation stage of the operation improved the properties of the final pellet mixture by coating the surfaces of the pellets thereby reducing their stickiness. The addition of 50 kg/t dry concentrate fines resulted in pellets with good flowability having a final moisture in the 13% w/w.

Further test work exploring the impact of moisture in the feed and water addition showed that suitable pellets could be formed when moist filter cake was fed to the Eirich mixer. The maximum feed moisture content appeared to be in the range of 26-28% w/w; above which large agglomerates and/or paste formed even with the addition of high quantities of dry fines.

Scale-up tests using a 75 L Eirich Mixer (Model R08W) confirm that pellets with excellent size and flow properties could be generated with a final moisture of around 24% through the addition of 50 kg/t fines. Pelletised material from these trials advanced into the rotary kiln pilot trials.

Figure 2:
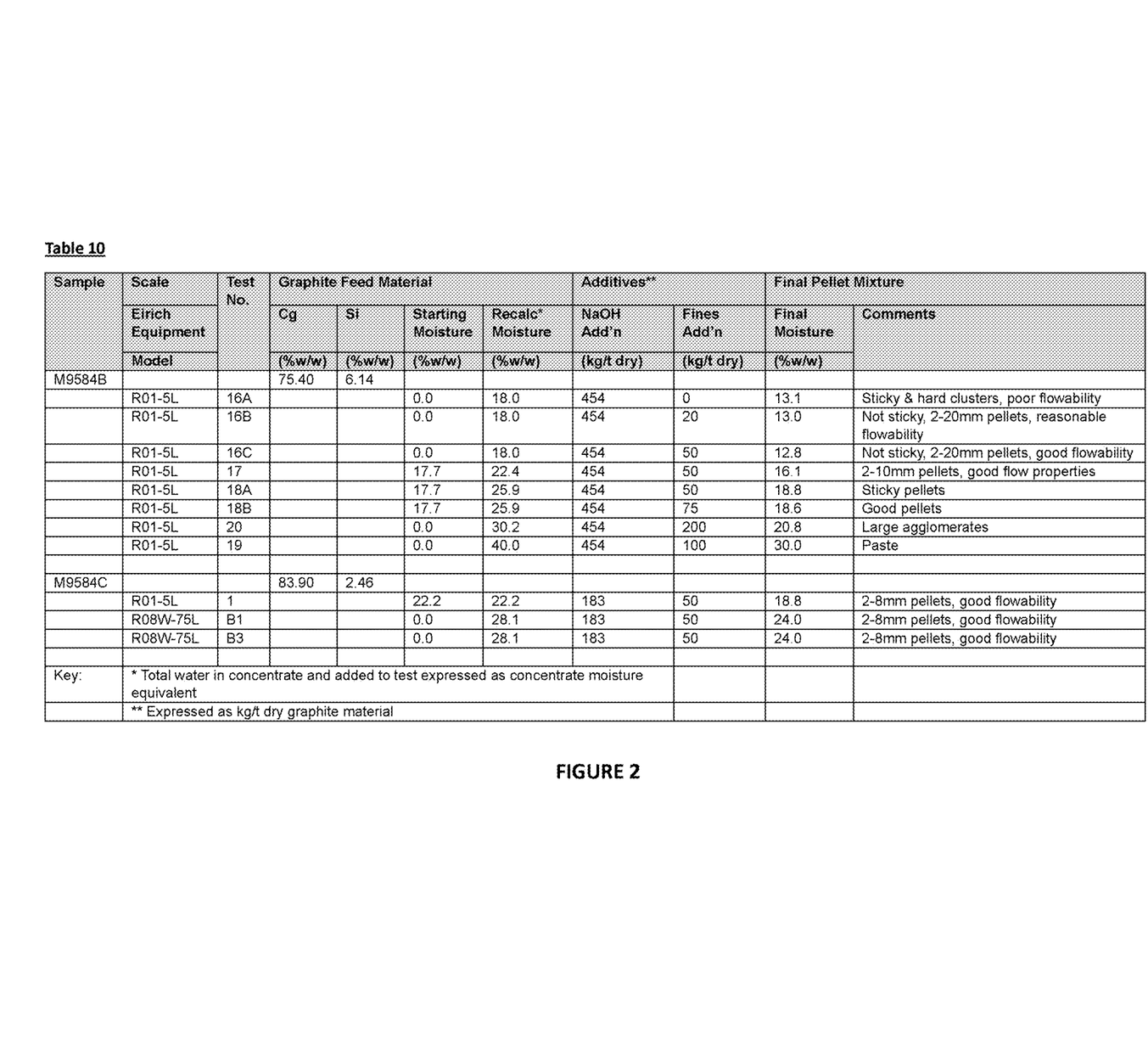
FIG. 2 shows a summary of the results from pelletisation test work and the conditions tested as Table 10, as discussed in the Examples.

The pelletisation test work results and conditions tested are summarised in Table 10 of FIG. 2. The results suggest that it may be possible to eliminate concentrate drying ahead of pelletisation, or at least reduce the drying duty.

Pellets produced in the 75 L Eirich unit had a bulk density of 1.10 t/m³ and a measure an angle of repose of 40°.

Caustic Roasting Pilot Trials

Fresh "green" pellets were loaded and stored into a hopper fitted with a variable speed belt conveyor feeding a rotary kiln with the following specification:
(i) Kiln Length—2.5 m
(ii) Kiln Diameter—300 mm
(iii) Kiln Slope—2.3°
(iv) Kiln Rotation—0.5 rpm
(v) Measured Residence Time—50 minutes (tracer)
(vi) Inner wall electric heating—30° C. differential from outer wall temperature sensor and inner wall at point of sinter product bed
(vii) Counter current heated air flow The kiln residence time was measured to be 50 minutes and two passes per campaign were made to provide longer baking time and investigate the impact of residence time. Two campaigns were completed, and the operating conditions along with key metallurgy data are summarised in Table 11 below.

TABLE 11

Caustic Roasting Pilot Plant Campaign Process and Production Data

| | | Campaign 1 | | Campaign 2 | |
|---|---|---|---|---|---|
| Parameter | Units | Pass 1 | Pass 2 | Pass 1 | Pass 2 |
| Feed Rate | (kg/h) | 8.2 | 7.8 | 8.8 | 8.4 |
| Temperature | (° C.) | 250 | 250 | 250 | 300 |
| Weight Loss | (%) | 26.0 | 0.0 | 23.3 | 1.9 |
| Overall Weight Loss | (%) | | 26.0 | | 24.8 |
| Carbon Losses | (%) | 3.7 | 0.0 | 0.3 | 2.0 |
| Overall Carbon Losses | (% w/w) | | 3.7 | | 2.3 |
| Sinter LOI | (% w/w) | 74.08 | 74.05 | 73.60 | 73.55 |
| Bulk Density | (kg/m3) | 920 | 950 | — | — |
| Angle of Repose | (°) | 33 | 30 | — | — |

Purification (employing ambient temperature leaching, i.e., ~15° C.) of pass 1 and 2 samples from both campaigns returned a LOI purity value of 99.88% irrespective of the baking conditions. Material handling data was measured only for Campaign 1 products.

Further leaching trials conducted at 45° C. on Campaign 2 pass 1 material did not improve the final purity returning an LOI value of 99.88%.

To investigate further Campaign 2 pelletised feed material was baked for 4 hours in a static oven and leached in the laboratory at 15° C., 30° C. and 45° C. The LOI values for these tests were 99.89%, 99.81% and 99.92% respectively, and suggest that leaching temperature is important. However more importantly comparing the 45° C. leaching results against the pilot baked product, baking time residence time is also important. The pilot kiln residence time of 100 minutes (2 passes of 50 minutes) appears to be insufficient to allow the reaction between caustic soda and silicate minerals to be complete, needed to achieve final purity requirements.

Concentrate Dryer Pilot Trials

Concentrate drying test work has been completed using the DryTech (equipment supplier) Flash Dryer confirming moist filter cake can be readily treated using the process of the present invention yielding a final dried product with <0.2% w/w moisture.

Filter cake samples with moisture levels ranging from 39% to 55% generated were tested. The use of a back mixer and disintegration stages used by DryTech for other commercial graphite drying applications, proved successful to handle and feed concentrate material with these high levels of moisture. Recycling dry material in the back-mix yielded a product with ≤43% w/w moisture. This material was found to be suitable for feeding to the flash drier unit.

The final dried concentrate properties measured are summarised below:
(i) Final Moisture: <0.2% w/w
(ii) Angle of Response: 36°
(iii) Flow Properties: Free Flowing Talphite C™ Dryer & Classification Pilot Trials Talphite C™ drying and product classification test work has been completed using the DryTech Flash Dryer, confirming it was possible to separate dried Talphite C™ material into three product streams having different PSD and Surface Area properties. Flash dryer off gases were classified using two stages of cyclones and a bag house to capture the fines exiting the paired secondary cyclone overflow streams.

It can be seen from the above description that the graphite material purification process of the present invention provides an improved graphite material purification process that, at least in certain forms, reduces carbon losses and/or reduces reliance on large volumes of highly concentrated acids when compared with processes of the prior art.

Modifications and variations such as would be apparent to the skilled addressee are considered to fall within the scope of the present invention.

The invention claimed is:

1. A graphite material purification process, the process comprising the steps of:
    (i) Passing a concentrate of the graphite material to be purified to a pelletisation step providing a pelletised material;
    (ii) Baking the pelletised material of step (i) in caustic conditions providing a sintered product and whereby one or more impurity minerals are rendered soluble;
    (iii) Passing the sintered product of step (ii) to a water leach step whereby at least a portion of the impurity minerals from step (ii) are solubilised, forwarded for effluent treatment, and separated from leach solids;
    (iv) Passing the leach solids of step (iii) to a first sulphuric acid leach step wherein impurity minerals partially leached in step (iii) are solubilised, forwarded for effluent treatment, and separated from leach solids;
    (v) Passing the leach solids of step (iv) to a hydrofluoric acid leach step, wherein partially leached impurity minerals are solubilised, forwarded for effluent treatment, and separated from leach solids;
    (vi) Passing the leach solids of step (v) to a second sulphuric acid leach step wherein impurity minerals or components precipitated during step (v) not leached in previous steps are solubilised, forwarded for effluent treatment, and separated from leach solids; and
    (vii) Passing the leach solids of step (vi) to one or more washing stages wherein at least a portion of any remaining soluble impurities are separated, and whereby a purified graphite material is produced.

2. The process of claim 1, wherein the purified graphite material of step (vii) has a pH of 7±2.5.

3. The process of claim 1, wherein the pelletisation step (i):
    (i) comprises the addition, in stepwise fashion, of caustic soda and water to the graphite material to be purified;
    (ii) produces pellets that are micro-pellets of about 2-10 mm in diameter; and/or
    (iii) produces pellets that are micro-pellets of 5 mm±2 mm.

4. The process of claim 1, wherein:
    (i) dry fines of the purified graphite material are added during the pelletisation step (i); or
    (ii) dry fines of the purified graphite material in the order of about 50 kg/t±25 kg/t are added during the pelletisation step (i).

5. The process of claim 1, wherein the caustic baking step (ii) is undertaken at between about 150 and 300° C. and causes the caustic soda and silicate impurity minerals to react and be rendered soluble in water and mild acid conditions.

6. The process of claim 1, wherein the amount of caustic soda added in the caustic baking step (ii) to the graphite material to be purified is calculated using the ratio of:
    (i) at least 1 mol caustic to 1 mol silicon;
    (ii) between 2.5 to 5.5 mol caustic to silicon; or
    (iii) 3.2 mol caustic: 1 mol silicon.

7. The process of claim 1, wherein the water leach step (iii) is undertaken:
    (i) at between about 5-60° C.;
    (ii) at about 35° C.±5° C.;
    (iii) in a single leach stage;
    (iv) in multiple counter-current leach stages;
    (v) in three counter-current leach stages; and/or
    (vi) the water leach step (iii) has a retention time of between about 30 to 240 minutes.

8. The process of claim 1, wherein the first sulphuric acid leach step (iv) is undertaken:
    (i) at between about 5 to 60° C.;
    (ii) at about 40° C.±5° C.;
    (iii) with a retention time of between about 30 to 240 minutes; and/or
    (iv) with a retention time of about 120 minutes.

9. The process of claim 1, wherein a residual free acid at the end of the first sulphuric leach step (iv) is:
    (i) in the range of about 5-75 g/L $H_2SO_4$; or
    (ii) about 50 g/L±5 g/L $H_2SO_4$.

10. The process of claim 1, wherein the first sulphuric acid leach step (iv) operates with:
    (i) between about 5 to 25% solids; or
    (ii) about 10% solids.

11. The process of claim 1, wherein the hydrofluoric acid leach step (v) is undertaken at:
    (i) between about 5-60° C.; or
    (ii) about 40° C.±5° C.

12. The process of claim 1, wherein a residual free acid at the end of the hydrofluoric acid leach step (v) is:
    (i) in the range of about 5-75 g/L HF;
    (ii) about 25 g/L±5 g/L HF.

13. The process of claim 1, wherein the hydrofluoric acid leach step (v) operates with:
    (i) between about 5 to 25% solids; or
    (ii) about 10% solids.

14. The process of claim 1, wherein the hydrofluoric acid concentration in the acid leach step (v) is in the range of about 15-50 g/L HF.

15. The process of claim 1, wherein the leach solids from the hydrofluoric leach step (v) have substantially no silicon, or only trace amounts thereof, remaining therein.

16. The process of claim 1, wherein the second sulphuric acid leach step (vi) is undertaken:
    (i) at between about 5-60° C.; or
    (ii) about 40° C.±5° C.

17. The process of claim 1, wherein the second sulphuric acid leach step (vi) operates with:
    (i) between about 5 to 25% solids;
    (ii) about 10% solids.

18. The process of claim 1, wherein the second sulphuric acid leach step (iv) has a retention time of:
    (i) between about 30 to 240 minutes; or
    (ii) about 120 minutes.

19. The process of claim 1, wherein the residual free acid at the end of the second sulphuric leach step (iv) is in the range of:
    (i) about 5-75 g/L $H_2SO_4$; or
    (ii) about 50 g/L±5 g/L $H_2SO_4$.

20. The process of claim 1, wherein acid solutions from the second sulphuric acid leach step (vi) are recovered and recycled to the first sulphuric acid leach step (vi) and second sulphuric acid leach step (vi).

21. The process of claim 1, wherein the washing stages of step (vii) comprise:
  (i) a single repulp-filtration stage using deionised water;
  (ii) multiple counter-current repulp-filtration stages using deionised water; or
  (iii) five multiple counter-current repulp-filtration stages using deionised water.

22. The process of claim 1, wherein liquid, residual salts, and/or acidity from the residual solids of the second sulphuric acid leach step (vi) are recovered in the washing stages of step (vii) and returned to one or both of the sulphuric acid leach steps (iv) and (vi).

23. The process of claim 1, wherein effluent from the water leach step (iii), and the two sulphuric acid leach steps (iv) and (vi) are treated in a first effluent treatment plant to generate a liquid effluent containing sodium and calcium sulphate and a solid containing gypsum and metal hydroxides.

24. The process of claim 23, wherein the first effluent treatment plant comprises contact of the effluent from the water leach step (iii), and the two sulphuric acid leach steps (iv) and (vi) with either lime or caustic soda, and iron sulphate, as either a ferric or ferrous salt.

25. The process of claim 1, wherein effluent bled from the hydrofluoric leach step (v) is treated in a second effluent treatment plant to generate a liquid effluent containing calcium sulphate and a solid containing calcium fluoride, gypsum, and metal hydroxides.

26. The process of claim 1, wherein the carbon recovery of the graphite material purification process is:
  (i) greater than about 87%; or
  (ii) between about 87.3% and 96.0%.

27. The process of claim 1, wherein the Loss on Ignition (LOI) for the purified graphite material product of the process is:
  (i) greater than or equal to about 99.90%;
  (ii) about 99.90 to 99.97%; or
  (iii) 99.96 to 99.97%.

28. The process of claim 1, wherein the carbon as graphite content of the purified graphite material product of the process is greater than 99.5% w/w.

29. The process of claim 1, wherein the surface area (BET) of the purified graphite material product of the process is:
  (i) in the range of about 5 to 10 $m^2g$; or
  (ii) about 7.0 $m^2/g \pm 2.0$ $m^2/g$.

* * * * *